3,329,730
DEHYDROHALOGENATION OF HALOGENATED SATURATED HYDROCARBONS

Van C. Vives, Bartlesville, Okla., assignor to Phillips Petroleum Company, a corporation of Delaware
No Drawing. Filed Mar. 16, 1965, Ser. No. 440,310
8 Claims. (Cl. 260—666)

This invention is directed to the dehydrohalogenation of halogenated saturated hydrocarbons to produce olefins. In one aspect this invention relates to a catalytic method for dehydrohalogenating cycloalkyl halides such as cyclohexyl chloride to produce cyclohexene. In another aspect this invention relates to a catalyst for dehydrohalogenating alkyl halides such as hexyl chloride.

A variety of processes have been proposed for the preparation of olefins from the corresponding alkyl halide or cycloalkyl halide. One process which has received considerable attention is the dehydrochlorination of cyclohexyl chloride, including both thermal and catalytic dehydrochlorination methods to produce cyclohexene. Although several of these processes give relatively high ultimate yields of cyclohexene, it has been difficult to obtain sufficiently high ultimate yields at high per pass conversion to make such processes economically attractive. High yields at high conversion can be obtained in thermal processes employing quartz reaction tubes; however, the limited size of quartz reaction tubes, together with their high cost, has prevented such process from being economically attractive. Many catalysts have been proposed and utilized for the dehydrohalogenation of various halogenated hydrocarbons including alkyl halide and cycloalkyl halides. For example, aluminum hydrosilicate clays, commonly known as bleaching clay, have been utilized for the dehydrochlorination of cyclohexyl chloride. Unfortunately use of these materials at temperatures sufficiently high to obtain adequate per pass conversions leads to extensive isomerization of the produced cyclohexene to methylcyclopentenes, thereby reducing the ultimate yield of cyclohexene.

It is an object of this invention to provide an improved process for the catalytic dehydrohalogenation of halogenated saturated hydrocarbons. It is also an object of this invention to provide an improved catalyst for the dehydrohalogenation of halogenated saturated hydrocarbons. A further object of this invention is the provision of a catalyst and process for the dehydrochlorination of cyclohexyl chloride to produce cyclohexene.

I have discovered that the catalytic effect of aluminum hydrosilicate clay on the dehydrohalogenation of halogenated saturated hydrocarbons is greatly increased by treating an aluminum hydrosilicate clay, that has been used as catalyst in the dehydrohalogenation of a halogenated saturated hydrocarbon, with ammonia at elevated temperature. The treatment of the clay with ammonia is carried out in a manner so as to subject the clay to an effective amount of ammonia. For example, the clay can be charged to a catalyst tube through which the hydrocarbon halide is to be passed, heated to an elevated temperature which can be the dehydrohalogenation temperature and contacted with anhydrous ammonia for about 5 to 60 minutes. A particularly convenient and effective method for treating the clay with ammonia is to pass a stream of anhydrous ammonia through the catalyst tube charged with the clay at a liquid hourly space velocity of about 0.5 to 10 at the dehydrohalogenation temperature for a time in the range of about 5 to 60 minutes.

Aluminum hydrosilicate bleaching clays generally are applicable as catalysts according to this invention. Typical examples of such clays include fuller's earth, bentonite and china clay.

Halogenated saturated hydrocarbons which are applicable to the process of this invention are the halogenated straight chain alkanes, halogenated branched chain alkanes, and halogenated cycloalkanes, including alkyl-substituted halogenated cycloalkanes. While the process is particularly suited to the dehydrohalogenation of halogenated straight chain alkanes and halogenated cycloalkanes, it can also be used for the dehydrohalogenation of halogenated branched chain alkanes, as the ammonia-treated fuller's earth catalyst effects dehydrohalogenation while minimizing isomerization to more highly branched materials even if the feedstock does contain some skeletal branching. Furthermore, while the process is applicable to dehydrohalogenation broadly, it is particularly useful for dehydrochlorination and dehydrobromination, especially dehydrochlorination. Generally speaking, the halogenated saturated hydrocarbons which are dehydrohalogenated by the process of this invention will contain from 4 to 24, preferably 6 to 20, carbon atoms and from 1 to 3 halogen atoms, preferably 1 halogen atom.

Some specific examples of halogenated saturated hydrocarbons which can be dehydrohalogenated by the process of this invention are 1-chlorobutane, 2-chloropentane, 3-bromoheptane, 2-methyl-3-iodooctane, 2,3-dimethyl-1-bromononane 2-chlorododecane, 3-fluorotetradecane, 2,5-dichlorohexadecane, 2,5,7-tribromoeicosane 4-chlorohexadecane 1-chlorooctadecane, 1-chloroeicosane, 1-chlorotetraeicosane chlorocyclohexane, 2-methyl-1-chlorocyclohexane, 4-methyl-1-bromocyclopentane, chlorocyclooctane, bromocyclododecane, 4-n-dodecyl-1-chlorocyclododecane and the like. Mixtures of halogenated saturated hydrocarbons such as are obtained from the chlorination of mixed paraffins are also amenable to dehydrohalogenation by the process of this invention.

A particular feature of the invention lies in the discovery that the ammonia treatment of the aluminum hydrosilicate clay produces a catalyst of decreased isomerization activity without adversely affecting the per pass conversion. This feature is particularly evident if the aluminum hydrosilicate clay has been utilized as a catalyst for the dehydrohalogenation of a halogenated saturated hydrocarbon for at least a short time prior to treatment with ammonia. Thus, a dehydrohalogenation reaction treatment at dehydrohalogenation temperature for a period of about 10 to 60 minutes prior to the ammonia treatment of the clay produces a pronounced beneficial effect on the resulting catalyst.

The dehydrohalogenation of hydrocarbon halides can be effected with minimum isomerization to undesired by-products by first contacting an aluminum hydrosilicate with a hydrocarbon halide under dehydrohalogenation conditions, following which the catalyst is treated with ammonia. It is desirable to purge the catalyst with an inert gas such as nitrogen between the ammonia treatment and the dehydrohalogenation. Following the ammonia treatment, the catalyst is then employed for dehydrohalogenation of hydrocarbon halides, including halogenated straight chain saturated hydrocarbons and halogenated cycloalkanes. When the effect of the ammonia treatment decreases, that is, the isomerization activity of the catalyst increases, the ammonia treatment can be repeated. It can be seen that an alternate treatment with hydrocarbon halide and ammonia can be utilized.

The dehydrohalogenation of hydrocarbon halides, such as cyclohexyl chloride, can be carried out batchwise or continuously. It is preferred to operate the process in a continuous manner by utilizing the ammonia-treated aluminum hydrosilicate clay catalyst in a fixed bed through which the preheated cyclohexyl chloride is passed. The catalyst tube can be fabricated from quartz or conventional materials of construction such as stainless steel or carbon steel. The dehydrohalogenation temperatures employed can vary widely, ranging from 175 to 375° C. and will usually be in the range of about 200 to 300° C. The rate at which the cyclohexyl chloride is passed over the ammonia-treated clay catalyst can also vary widely with liquid hourly space velocities (LHSV) ranging from about .5 to 10 being commonly utilized. Reaction pressure will usually be as low as practical.

As in the case of most fixed-bed catalytic operations, the catalyst bed eventually will become fouled with materials which interfere with normal operation. When the catalyst becomes fouled, it is within the scope of this invention to regenerate the catalyst by burning off the fouling material. This can be conveniently carried out by passing a stream of air or other oxygen-containing gas through the catalyst bed at a temperature of from about 450 to 700° C. for a time of a few minutes to several hours. Following this treatment, the catalyst can be treated with halogenated saturated hydrocarbon followed by treatment with $NH_3$ as described above.

Following dehydrohalogenation the reactor effluent can be condensed and the liquid products can then be distilled to recover the produced olefin, unconverted hydrocarbon halide and minor amounts of by-products. The unconverted hydrocarbon halides can then be recycled to the dehydrohalogenation zone. The following examples will be helpful in attaining an understanding of the invention but are considered to be illustrative and should not be construed as unduly limiting the invention.

EXAMPLE I

A series of runs was carried out in which cyclohexyl chloride was dehydrochlorinated to form cyclohexene by contact with a Florida fuller's earth. A typical analysis of the Florida fuller's earth is tabulated below.

Table I

| | Weight percent |
|---|---|
| $SiO_2$ | 58.10 |
| $Al_2O_3$ | 15.43 |
| $Fe_2O_3$ | 4.95 |
| FeO | 0.30 |
| CaO | 1.75 |
| MgO | 2.44 |
| $Na_2O$ | 0.27 |
| $K_2O$ | 0.66 |
| $CO_2$ | 0.84 |

Sp. gr., 2.30.

Some of the runs were made with untreated fuller's earth, some with $NH_3$-treated fuller's earth and one with $NH_4Cl$-treated fuller's earth. The results of these runs are tabulated in Table II.

chloride would be formed on the surface and/or in the catalyst pores. Run 4, however, wherein the fuller's earth was treated with ammonium chloride, shows that the ammonium chloride treatment promoted isomerization and production of heavier materials excessively. Runs were also made wherein the fuller's earth was treated with KOH and the results of those runs indicate that merely making the catalyst basic does not provide the beneficial effects obtained with the ammonia treatment.

EXAMPLE II

A mixture of primary and secondary dodecyl chloride, prepared by chlorination of n-dodecane, is dehydrochlorinated according to the process of this invention. In this run the fuller's earth catalyst of Example I is charged to the catalyst tube of Example I and contacted with the mixed dodecyl chlorides for 15 minutes at 370° C. and a space velocity (LHSV) of 1.0. The catalyst is then treated with $NH_3$ by passing $NH_3$ up through the catalyst bed until $NH_3$ is detected in the effluent. The $NH_3$-treated catalyst is then contacted with the mixed dodecyl chloride at 370° C. and a space velocity of 1.0–1.5. The resulting yield of straight chain dodecanes is much higher and the yield of branched chain dodecanes is correspondingly lower than are obtained in a control run when the mixed dodecyl chlorides are contacted at the same conditions with some fuller's earth catalyst which has not been treated with ammonia.

That which is claimed is:

1. A process for dehydrohalogenating halogenated saturated hydrocarbons which comprises contacting a halogenated saturated hydrocarbon at dehydrohalogenating conditions with an aluminum hydrosilicate clay dehydrohalogenation catalyst which has been used in the dehydrohalogenation reaction for at least about 10 to 60 minutes and then has been treated with anhydrous ammonia by passing ammonia through a bed of the clay until ammonia is detected in the effluent.

2. A process for producing cyclohexene which comprises contacting an aluminum hydrosilicate clay catalyst with a stream of cyclohexyl chloride at a temperature of about 175 to 375° C. for about 10 to 60 minutes; contacting the catalyst with anhydrous ammonia for about 5 to 60 minutes at a temperature of about 175 to 375° C.; and contacting the ammonia treated catalyst with cyclohexyl chloride at a liquid hourly space velocity of about 0.5 to 10 at a temperature of about 175 to 375° C. to produce cyclohexene.

3. A process for producing cyclohexene which comprises contacting an aluminum hydrosilicate clay catalyst alternately with anhydrous ammonia and with cyclohexyl chloride at a liquid hourly space velocity of about 0.5 to 10; at a temperature of about 175 to 375° C.; and for a time in the range of about 10 to 60 minutes for each contacting period.

4. The process of claim 3 wherein the aluminum hydrosilicate clay is fuller's earth.

5. The process of claim 4 wherein the temperature is in the range of about 200 to 300° C.

Table II.—Dehydrochlorination of cyclohexyl chloride

| Run No. | Catalyst | Temperature, ° C. | Conversion, percent | LHSV | Mol percent Cyclohexene | Ultimate Yield,[1] Methylcyclopentenes | Heavies [2] |
|---|---|---|---|---|---|---|---|
| 1 | Fuller's earth | 275 | 96 | 1.4 | 73.7 | 24.4 | 1.8 |
| 2 | do | 225 | 84 | 1.3 | 96 | 2.9 | 1.1 |
| 3 [3] | Fuller's earth/$NH_3$ | 275 | 96.1 | 1.0 | 96.7 | 3.3 | |
| 4 | Fuller's earth plus 1 wt. percent $NH_4Cl$ | 275 | 97.5 | 1.6 | 56.4 | 30.4 | 13.2 |
| 5 [3] | Fuller's earth/$NH_3$ | 275 | 97 | 1.34 | 56.6 | 39.8 | 3.6 |

[1] Calculations based on GLC analysis, a 10 ft. chromatographic column packed with silicone grease on fire brick.
[2] Determined by reverse flow GLC, assumed molecular weight of 200.
[3] Run 3 was carried out by treating the used catalyst from Run 1 with $NH_3$. Run 5 was carried out by treating fresh catalyst with $NH_3$. In each run the catalyst was treated in the reaction tube, at the indicated reaction temperature, with excess $NH_3$ for approximately 15 minutes. $NH_3$ was passed through the catalyst bed until $NH_3$ could be detected in the effluent gas.

Comparison of run 3 with runs 1, 2 and 5 clearly shows that ammonia treatment of catalyst which has been previous used for dehydrochlorination is superior in conversion and ultimate yield of cyclohexene to either the new catalyst or catalyst formed by ammonia treatment of new catalyst. It was thought that perhaps absorbed hydrogen chloride on the catalyst is necessary so that ammonium 6. A process for producing cyclohexene which comprises contacting an aluminum hydrosilicate clay that has been used as a catalyst for dehydrochlorinating cyclohexyl chloride with anhydrous ammonia at a temperature of about 175 to 375° C. for about 5 to 60 minutes; and then contacting the aluminum hydrosilicate clay with cyclohexyl chloride at a temperature in the range of about 175 to 375° C. for a time sufficient to convert at least about 95 mol percent of the cyclohexyl chloride to cyclohexene.

7. A process for producing a dehydrohalogenation catalyst which comprises contacting an aluminum hydrosilicate clay, that has been contacted with cyclohexyl halide at elevated temperature for a period of 10 to 60 minutes, with anhydrous ammonia at a temperature of about 175 to 375° C. for about 5 to 60 minutes.

8. A dehydrohalogenation catalyst comprising an aluminum hydrosilicate clay that has been contacted with cyclohexyl halide for about 10 to 60 minutes at a temperature of about 175 to 375° C. and then contacted with anhydrous ammonia for about 5 to 60 minutes at a temperature of about 175 to 375° C.

References Cited
UNITED STATES PATENTS

| | | | |
|---|---|---|---|
| 2,186,370 | 1/1940 | Dosser | 260—616 |
| 2,246,646 | 6/1941 | Urbain et al. | 252—438 |
| 2,363,876 | 11/1944 | La Lande | 252—483 |

DELBERT E. GANTZ, *Primary Examiner.*

V. O'KEEFE, *Assistant Examiner.*

UNITED STATES PATENT OFFICE
CERTIFICATE OF CORRECTION

Patent No. 3,329,730                        July 4, 1967

Van C. Vives

It is hereby certified that error appears in the above numbered patent requiring correction and that the said Letters Patent should read as corrected below.

Column 5, line 14, before "10" insert -- about --.

Signed and sealed this 20th day of August 1968.

(SEAL)
Attest:

Edward M. Fletcher, Jr.                      EDWARD J. BRENNER
Attesting Officer                           Commissioner of Patents